(12) United States Patent
Lu et al.

(10) Patent No.: US 11,145,894 B2
(45) Date of Patent: Oct. 12, 2021

(54) PROCESS FOR FABRICATION OF ENHANCED β"-ALUMINA SOLID ELECTROLYTES FOR ENERGY STORAGE DEVICES AND ENERGY APPLICATIONS

(71) Applicant: BATTELLE MEMORIAL INSTITUTE, Richland, WA (US)

(72) Inventors: Xiaochuan Lu, Richland, WA (US); Jin Yong Kim, Richland, WA (US); Guosheng Li, Richland, WA (US); Kerry D. Meinhardt, Richland, WA (US); Vincent L. Sprenkle, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 306 days.

(21) Appl. No.: 14/465,476

(22) Filed: Aug. 21, 2014

(65) Prior Publication Data

US 2016/0056499 A1    Feb. 25, 2016

(51) Int. Cl.
   *H01M 10/0562*  (2010.01)
   *H01M 6/18*  (2006.01)
   (Continued)

(52) U.S. Cl.
   CPC ......... *H01M 10/0562* (2013.01); *C01F 7/002* (2013.01); *C01F 7/028* (2013.01);
   (Continued)

(58) Field of Classification Search
   CPC .......................... H01M 4/80; H01M 10/0562
   See application file for complete search history.

(56) References Cited

U.S. PATENT DOCUMENTS 4,113,928 A * 9/1978 Virkar .................. C01F 7/02
                                                    264/6
4,358,516 A * 11/1982 Lange ............... H01M 10/3918
                                                    429/320

(Continued)

FOREIGN PATENT DOCUMENTS

CN    1046879 A    11/1990
CN    1114503 A    1/1996
(Continued)

OTHER PUBLICATIONS

International Search Report/Written Opinion for International Application No. PCT/US2015/032228, International Filing Date May 22, 2015, dated Aug. 19, 2015.

(Continued)

*Primary Examiner* — Cynthia H Kelly
*Assistant Examiner* — Julian Anthony
(74) *Attorney, Agent, or Firm* — Klarquist Sparkman, LLP (57) ABSTRACT

A dense β"-alumina/zirconia composite solid electrolyte and process for fabrication are disclosed. The process allows fabrication at temperatures at or below 1600° C. The solid electrolytes include a dense composite matrix of β"-alumina and zirconia, and one or more transition metal oxides that aid the conversion and densification of precursor salts during sintering. The composite solid electrolytes find application in sodium energy storage devices and power-grid systems and devices for energy applications.

29 Claims, 7 Drawing Sheets

(51) Int. Cl.
*C04B 35/113* (2006.01)
*C01G 25/02* (2006.01)
*C01F 7/02* (2006.01)
*C01G 25/00* (2006.01)
*C04B 35/119* (2006.01)
*C04B 35/64* (2006.01)
*C04B 35/488* (2006.01)
*C01F 7/00* (2006.01)
*H01M 10/054* (2010.01)
*H01M 10/39* (2006.01)

(52) U.S. Cl.
CPC ............ *C01G 25/00* (2013.01); *C01G 25/02* (2013.01); *C04B 35/113* (2013.01); *C04B 35/119* (2013.01); *C04B 35/4885* (2013.01); *C04B 35/64* (2013.01); *C01P 2002/50* (2013.01); *C01P 2002/54* (2013.01); *C01P 2002/72* (2013.01); *C01P 2006/40* (2013.01); *C04B 2235/3201* (2013.01); *C04B 2235/3203* (2013.01); *C04B 2235/3218* (2013.01); *C04B 2235/3225* (2013.01); *C04B 2235/3232* (2013.01); *C04B 2235/3244* (2013.01); *C04B 2235/3246* (2013.01); *C04B 2235/3262* (2013.01); *C04B 2235/441* (2013.01); *C04B 2235/443* (2013.01); *C04B 2235/604* (2013.01); *C04B 2235/6025* (2013.01); *C04B 2235/6567* (2013.01); *C04B 2235/77* (2013.01); *H01M 10/054* (2013.01); *H01M 10/39* (2013.01); *H01M 10/399* (2013.01); *H01M 10/3918* (2013.01); *H01M 2300/0071* (2013.01); *H01M 2300/0077* (2013.01); *H01M 2300/0091* (2013.01)

(56) References Cited

U.S. PATENT DOCUMENTS

| | | | | |
|---|---|---|---|---|
| 4,668,644 A | * | 5/1987 | Filhol | C04B 35/111 257/E23.009 |
| 4,732,741 A | * | 3/1988 | Duncan | C01F 7/028 423/119 |
| 4,800,051 A | * | 1/1989 | Yan | C01F 7/36 264/660 |
| 5,496,513 A | * | 3/1996 | Nakane | C04B 35/113 419/19 |
| 5,786,110 A | * | 7/1998 | Angell | H01M 6/14 429/188 |
| 6,117,807 A | | 9/2000 | Virkar et al. | |
| 2008/0138569 A1 | * | 6/2008 | Collier | B01D 69/10 428/116 |
| 2015/0064532 A1 | * | 3/2015 | Kumar | H01M 10/3918 429/102 |

FOREIGN PATENT DOCUMENTS

| | | |
|---|---|---|
| CN | 1175984 A | 3/1998 |
| CN | 1526683 A | 9/2004 |
| CN | 101563797 A | 10/2009 |
| CN | 102244304 A | 11/2011 |
| EP | 0545438 A1 | 6/1993 |
| JP | 2000143330 | 5/2000 |
| WO | 2008079563 A2 | 7/2008 |

OTHER PUBLICATIONS

Yang, L-P., et al., The mechanical and electrical properties of ZrO2—TiO2—Na-beta/beta"-alumina composite electrolyte synthesized via a citrate sol-gel method, Ceramics International, 40, 2014, 9055-9060.

McEntire, B. J., et al., and Characterization of Zirconia Toughened Beta"-Alumina, Extended Abstracts, Electrochemical Society, Princeton, New Jersey, US, 86-2, Sep. 21, 1986, 113.

Virkar, A. V., et al., Fracture Properts of Polycrystalline Lithia-Stabilized B"-Alumina, Journal of the American Ceramic Society, vol. 60, No. 1-2, 1977, 58-61.

Virkar, A. V., et al., Resistivity-Microstructure Relations in Lithia-Stabilized Polycrystalline B"-Alumina, Journal of the American Ceramic Society, vol. 61, No. 5-6, 1978, 250-252.

Stevens, R., et al., Review Structure, Properties and Production of B-Alumina, Journal of Materials Science, 19, 1984, 695-715.

Lu, X., et al., Advanced Materials for Sodium-Beta Alumina Batteries; Status, Challenges and Perspectives, Journal of Power Sources, 195, 2010, 2431-2442.

* cited by examiner

PROCESS FOR FABRICATION OF ENHANCED β"-ALUMINA SOLID ELECTROLYTES FOR ENERGY STORAGE DEVICES AND ENERGY APPLICATIONS

STATEMENT REGARDING RIGHTS TO INVENTION MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

FIELD OF THE INVENTION

The present invention relates generally to β"-alumina solid electrolytes and methods of making. More particularly, the invention relates to a new process for lower temperature fabrication of dense β"-alumina solid electrolytes suitable for energy storage devices and energy applications.

BACKGROUND OF THE INVENTION

Alumina-phase solid electrolytes are good solid electrolytes for load-leveling batteries as they provide a strong ionic conductivity given the high concentration of sodium ions that pass through the electrolyte. Solid electrolytes composed exclusively of the beta-double prime (β" or Beta") alumina phase material are preferred because sodium ions are the only conducting ions in the BASE material. However, β"-alumina phase solid electrolytes (BASE) are difficult to synthesize. Conventional fabrication involves dual sintering steps. First, an α-alumina phase powder is sintered at a high temperature of 1600° C. to form a single consolidated monolithic structure containing the α-alumina phase material. The term "consolidated" means the starting powder when sintered combines all of the powder into a single block structure. The consolidated block structure containing the α-alumina phase material is then packed in a bed of Na-containing oxides/nitrates and/or Li-containing oxides/nitrates powders and sintered a second time at a temperature of 1400° C. to convert the α-alumina phase material into β"-alumina phase material. The term conversion as used herein refers to the change from the α-alumina phase material into the β"-alumina phase material. Na-containing and Li-containing oxides and nitrate powders in the powder bed stabilize the β"-alumina phase material as it forms. However, sintering the α-alumina phase material at high temperatures presents well-known problems. First, evaporation of the stabilizing elements sodium and lithium is high at the high sintering temperatures required for consolidation. Sodium lost during sintering lowers the conductivity in the resulting solid electrolyte. In addition, grain growth is often exaggerated in the consolidated structures due to the high sintering temperatures. Exaggerated grain growth dramatically reduces mechanical strength of the resulting solid electrolyte. Further, the powder packing used in the powder bed is typically discarded following sintering, which adds significant cost to the process. Accordingly, new processes are needed for making pure dense β"-alumina phase solid electrolytes with both a desired density and a fine-grained microstructure suitable for use in sodium-conducting energy storage devices (e.g., ZEBRA & NaS batteries) for energy applications. The present invention addresses these needs.

SUMMARY OF THE INVENTION

The present invention includes a process for fabrication of a dense β"-alumina/zirconia or dense β"-alumina/yttrium-stabilized zirconia (YSZ) solid electrolytes suitable for, e.g., sodium-conducting energy storage devices for energy applications. The process may include sintering a precursor mixture (e.g., as powders) containing a selected ratio of alumina (containing any alumina phase or phases) and zirconia or YSZ together in air at a temperature below about 1600° C. for a sufficient time to form a dense β"-alumina/zirconia or YSZ composite solid electrolyte with a density greater than about 90%. The term "precursor mixture" used herein is a mixture prior to sintering that contains alumina in any of its phased forms or alumina precursors, metal stabilization salts such as lithium salts and/or magnesium salts or their precursors, sodium salts or their precursors that yield a selected conductivity in the resulting solid electrolyte, and one or more transition metal oxides including, e.g., zirconia or YSZ, $MnO_2$, or their transition metal oxide precursors. Constituents of the precursor mixture may be combined or prepared in one or more batches with the same or different constituents to facilitate handling. No limitations are intended.

The present invention also includes a dense high-performance composite solid electrolyte. The solid electrolyte may include a sintered composite containing pure β"-alumina and zirconia or YSZ as phase materials and one or more transition metal oxides. "Sintered" and "sintering" as the terms are used herein in reference to the present invention refer to the process of heating a precursor mixture containing selected quantities of alumina, zirconia or YSZ, and one or more metal oxides together typically at a temperature below 1600° C. and a time sufficient to simultaneously convert the alumina in the precursor mixture into pure β"-alumina that also consolidates the precursor mixture into a dense β"-alumina/zirconia or YSZ composite solid electrolyte. The dense composite solid electrolyte may be employed in sodium-conducting energy storage devices including, but not limited to, e.g., ZEBRA batteries, sodium metal halide batteries, liquid sodium batteries, molten sodium batteries, sodium-sulfur (Na/S) batteries, and intermediate temperature (<200° C.) sodium beta batteries. Sodium energy storage devices may be employed as components in energy producing devices and systems such as, e.g., power-grid systems and in other energy producing applications.

The process simultaneously converts all alumina phases in the precursor mixture into pure β"-alumina and further densifies precursors in the precursor mixture in a single conversion/densification step into dense β"-alumina/zirconia or dense β"-alumina/yttrium-stabilized zirconia (YSZ) high-performance composite solid electrolytes. The process eliminates need for separate densification and conversion steps in packed powder beds as required in conventional fabrication processing. Alumina in the precursor mixture may include $\alpha\text{-}Al_2O_3$, $\beta\text{-}Al_2O_3$, $\gamma\text{-}Al_2O_3$, or may be obtained from precursors such as aluminum oxyhydroxides, aluminum hydroxides, other alumina precursors, or combinations of these various materials.

Aluminum oxyhydroxides may include, but are not limited to, e.g., Boehmite and pseudo Boehmite. Aluminum hydroxides may include, but are not limited to, e.g., Bayerite and Gibbsite.

In some applications, the zirconia may include YSZ in which YSZ is doped with a quantity of yttrium at or below about 10 mol % by weight.

In some applications, ratio of alumina to zirconia or YSZ in the precursor mixture prior to sintering may be greater than about 50% by volume. In some applications, ratio of alumina to zirconia or YSZ may be less than about 50% by volume.

In some applications, the solid electrolyte may include a concentration of the one or more transition metal oxides at or below about 10% by weight on average; or between about 5 mol % to about 10 mol % on average.

In some applications, the precursor mixture containing alumina and zirconia or YSZ may include a selected quantity of the metal oxide $TiO_2$ or titania precursors that assist the conversion of alumina or alumina precursors in the precursor mixture to α-alumina upon sintering. In some applications, the precursor mixture containing alumina and zirconia or YSZ may include a selected quantity of $MnO_2$ or $MnO_2$ precursors that assist the sintering of the composite.

The solid electrolyte may include various shapes. In some applications, the solid electrolyte may include the form of a disk. In some applications, the solid electrolyte may include the form of a tube.

In some applications, the precursor mixture containing alumina and zirconia or YSZ may include a selected quantity of the metal oxides $TiO_2$ and $MnO_2$ or their precursors, and/or other transition metal oxides. The quantity of $TiO_2$, $MnO_2$, other titanium-containing oxides, other manganese-containing oxides, and combinations of these various oxides in the precursor mixture prior to sintering may be at or below about 10 mol %.

The process may include casting or pressing the precursor mixture of alumina, zirconia or YSZ, and transition metal oxides onto a tape prior to sintering. Casting methods include, but are not limited to, e.g., tape casting. Pressing methods include, but are not limited to, e.g., cold isostatic pressing (CIP).

Sintering of the precursor mixture containing selected precursors may be performed at temperatures selected substantially below those required for conventional processing. In some applications, sintering temperature may be between about 1400° C. to below about 1600° C. In some applications, sintering temperature may be below about 1500° C. In some applications, sintering temperature may be about 1400° C. In some applications, sintering temperature may be below about 1200° C. In some applications, sintering temperature may be about 900° C. In some applications, sintering temperature may be between about 900° C. to about 1200° C. In some applications, sintering temperature may be between about 1200° C. to about 1500° C. or to about 1600° C. Sintering at these temperatures significantly improves purity and resulting properties of the composite solid electrolyte.

In various applications, the solid electrolyte may include a ratio of sodium (Na) to aluminum (Al) of [1.67:10.67]; or [3.34:10.67]; or [4.18 to 10.67].

In some applications, the solid electrolyte may include a mechanical strength that is at least about 300 MPa. In some applications, the dense solid electrolyte may have a mechanical strength that is at least about 460 MPa. In some applications, the dense solid electrolyte may have a mechanical strength that is at least about 500 MPa.

In some applications, the dense composite solid electrolyte may include a density greater than about 90%. In some applications, the dense composite solid electrolyte may include a density between about 90% to about 95% or greater.

The dense composite solid electrolyte may include various selected shapes. Shapes are not limited. In some applications, the shape of the composite electrolyte may be in the form of a disk, a tube, or other shapes. No limitations are intended.

The solid electrolyte also exhibits excellent electrochemical performance. In particular, the solid electrolyte exhibits a low specific resistance (resistivity×thickness; or thickness÷conductivity) that reduces polarization of the cell. Conductivity of the solid electrolyte provides excellent electrochemical performance in energy storage devices.

The solid electrolyte may be a component of various sodium-conducting energy storage devices described herein. The solid electrolyte may also be a component of a power-grid system or device.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION

A dense β"-alumina/zirconia composite solid electrolyte and process for fabrication are disclosed. The composite electrolyte is a high-performance electrolyte with excellent electrochemical properties, a fine-grained microstructure, and a high mechanical strength for sodium-conducting energy storage devices suitable for energy applications. In the following description, embodiments of the present invention are shown and described by way of illustration of the best mode contemplated for carrying out the invention. It will be clear that the invention may include various modifications and alternative constructions. It should be understood that there is no intention to limit the invention to the specific forms disclosed, but, on the contrary, the invention is intended to cover all modifications, alternative constructions, and equivalents falling within the spirit and scope of the invention as defined in the claims. Therefore the description should be seen as illustrative and not limiting.

Figure 1:
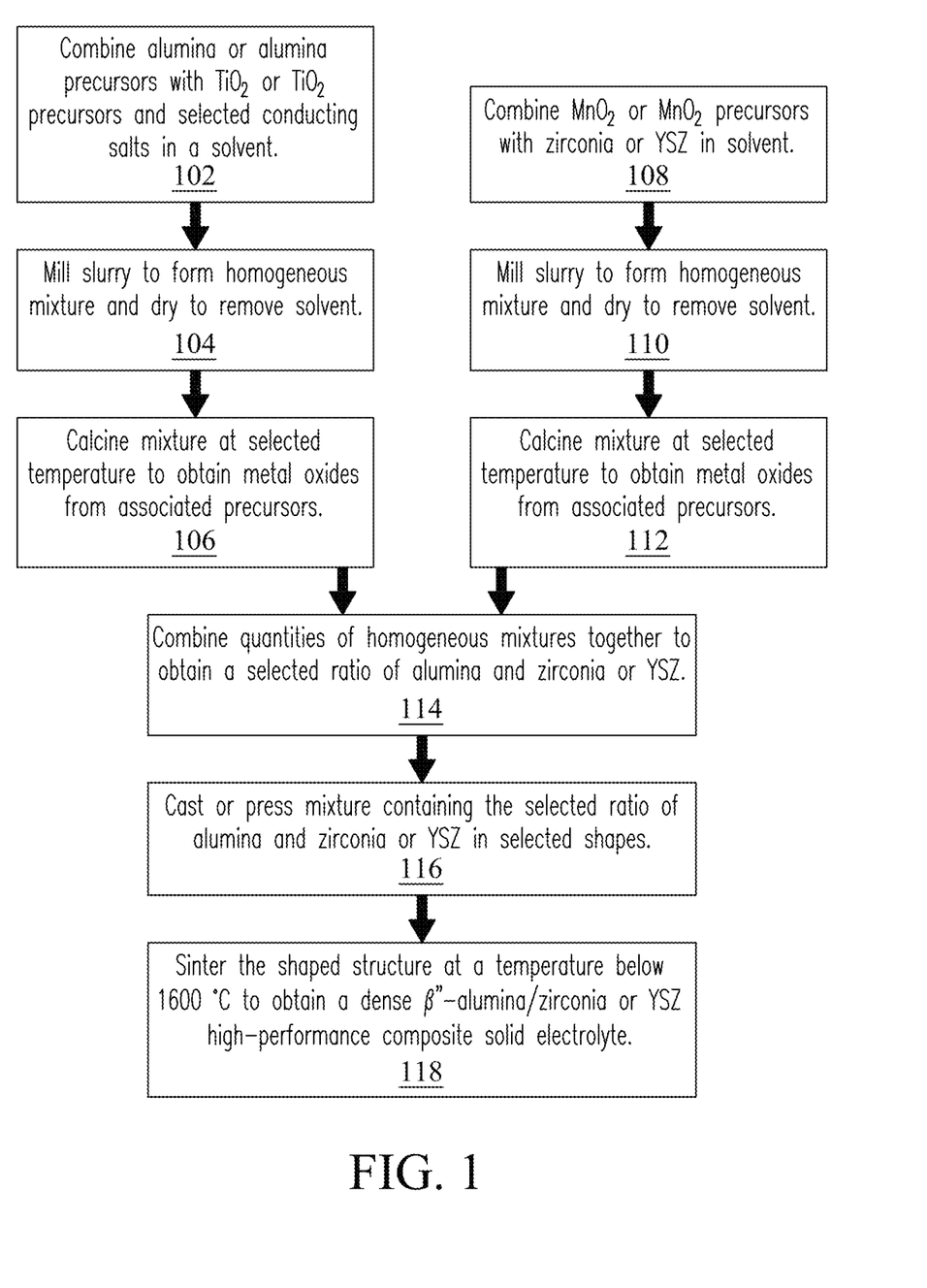
FIG. 1 shows a process for synthesis of dense β"-$Al_2O_3$/YSZ solid electrolytes in accordance with the present invention.

FIG. 1 presents an exemplary process for synthesis of a dense high performance composite solid electrolyte in accordance with the present invention. The process may include sintering a precursor mixture of alumina containing any alumina phases or selected alumina precursors, and zirconia or YSZ, and one or more transition metal oxides or selected metal oxide precursors together at a selected temperature that yields a dense β"-alumina/zirconia or dense β"-alumina/YSZ composite solid electrolyte.

In one exemplary step (102), alumina in any of its various forms or selected alumina precursors may be mixed with other precursor salts including sodium salts for conductivity, lithium and/or magnesium salts that stabilize the precursor mixture and the matrix of the resulting solid electrolyte, and one or more transition metal oxides or selected metal oxide precursor salts that aid the conversion of the various alumina phases to pure β"-$Al_2O_3$ and that assist the densification of the precursor mixture during sintering, as detailed further herein.

Alumina in the precursor mixture prior to sintering may include α-$Al_2O_3$, β-$Al_2O_3$, and/or γ-$Al_2O_3$. Alumina precursors may include, but are not limited to, aluminum oxyhydroxides, aluminum hydroxides, and combinations of these various materials. Aluminum oxyhydroxides may include, but are not limited to, e.g., Boehmite (a crystalline form of a basic aluminum oxide with chemical formula AlOOH) and pseudo Boehmite. Aluminum hydroxides may include, but are not limited to, e.g., Bayerite and Gibbsite.

Stabilizing metal element salts include, but are not limited to, e.g., lithium salts (e.g., $LiNO_3$, $Li_2CO_3$, etc.), and/or magnesium salts such as $Mg(NO_3)_2$, $MgCO_3$, and other magnesium salts.

Conductivity-producing precursor salts include, but are not limited to, e.g., sodium salts such as $NaNO_3$, $Na_2CO_3$, and other sodium salts.

Transition metal oxide salts may include, but are not limited to, e.g., $TiO_2$, $MnO_2$, other transition metal oxides, and including combinations of the various transition metal oxides.

Transition metal oxide precursors include, but are not limited to, e.g., Ti isoproxide, $Mn(NO_3)_2$, and other transition metal-containing salts.

Precursor salts may be mixed in selected solvents to form slurries or solutions. Addition of solvents facilitates mixing of the various precursor salts that aids formation of a homogeneous mixture of precursors and solids. Solvents may include, but are not limited to, e.g., n-alcohols (e.g., methanol, propanol, etc.), isopropyl alcohol (IPA), water, other solvents, and combinations of various solvents. Solvent volumes are not limited.

In another exemplary step (104), slurries containing precursor salts may be milled (e.g., ball milled) for a time sufficient to form a homogenous precursor mixture. In some embodiments, the precursor mixture may be milled or mixed for a time of 5 hours on average. However, milling and mixing times are not intended to be limited. The homogenous precursor mixture of precursor salts may then be dried to remove the solvent. Drying temperatures and drying times are not limited.

In another exemplary step (106), the homogenous precursor mixture may be calcined at a temperature selected to convert various alumina or alumina precursor phases into a single α-alumina phase material. In some applications, the calcination temperature may be selected between about 800° C. to about 900° C. In some applications, the calcination temperature may be selected between about 600° C. to about 800° C. In some applications, the calcination temperature may be selected between about 400° C. to about 600° C. Times to achieve calcination are not limited.

Metal oxide precursors such as Ti precursor may also be converted to the transition metal oxide (e.g., $TiO_2$). Presence of $TiO_2$ in the precursor mixture aids the formation of the β"-alumina phase material upon sintering as discussed further herein.

In some embodiments, concentration of $TiO_2$ in the precursor mixture may be at or below about 10 mol %. In some embodiments, concentration of $TiO_2$ in the precursor mixture may be between about 5 mol % to about 10 mol % on average. In some embodiments, concentration of $TiO_2$ in the precursor mixture may be between about 2 mol % to about 5 mol % on average. $TiO_2$ precursors when used may include a concentration that yields the selected or desired concentration of $TiO_2$ in the resulting solid electrolyte. No limitations are intended.

In another exemplary step (108), a $MnO_2$ or a precursor salt such as $Mn(NO_3)_2$ may be dissolved in water or another suitable solvent and mixed with zirconia or YSZ to form a slurry. Quantity of solvent is not limited. In some embodiments, concentration of $MnO_2$ (or other metal oxide) may be at or below about 10 mol %. In some embodiments, concentration of $MnO_2$ in the precursor mixture may be between about 5 mol % to about 10 mol % on average. In some embodiments, concentration of $MnO_2$ in the precursor mixture may be between about 2 mol % to about 5 mol % on average. Metal oxide precursor salts in the precursor mixture when used may include a concentration that yields the selected or desired concentration of $MnO_2$ in the resulting solid electrolyte. No limitations are intended.

In another exemplary step (110), the slurry containing manganese-containing transition metal oxides or manganese-containing precursors and zirconia or YSZ may be mixed or milled for a time sufficient to form a homogenous precursor mixture. In some embodiments, the precursor mixture may be milled or mixed for a time of 5 hours on average. However, milling and mixing times are not intended to be limited. The slurry containing the mixed salts and precursors may then be dried to remove any solvents to yield the homogeneous precursor mixture. Drying temperatures and drying times are not limited.

In another exemplary step (112), the homogeneous precursor mixture containing zirconia or YSZ and Mn-containing salts may be calcined together for a time sufficient to form the transition metal oxide $MnO_2$ which is uniformly distributed or disbursed in the precursor mixture. In some embodiments, calcination temperature may be selected between about 800° C. to about 900° C. In some embodiments, calcination temperature may be selected between about 600° C. to about 800° C. In some embodiments, calcination temperature may be selected between about 400° C. to about 600° C. Times to achieve calcination are not limited. Presence of $MnO_2$ in the precursor mixture aids the formation of the β"-alumina phase material upon sintering. Presence of zirconia or YSZ aids densification of the solid electrolyte upon sintering.

In another exemplary step (114), selected ratios of the α-alumina phase material containing $TiO_2$ or another metal oxide and zirconia or YSZ containing $MnO_2$ or another metal oxide may be mixed together to form a homogeneous mixture of all components.

In some embodiments, the weight ratio of α-alumina to zirconia or YSZ in the mixed powder is about 7:3 [alumina:zirconia or YSZ].

In some embodiments, the volume ratio of α-alumina to zirconia or YSZ in the mixed powder may be greater than about 50% on average.

In some embodiments, the volume ratio of α-alumina to zirconia or YSZ in the mixed powder may be less than about 50% on average.

In the figure, alumina salts or precursor salts may be mixed separately from the zirconia or YSZ. However, the present invention is not intended to be limited thereto. For example, in some embodiments, alumina salts or alumina precursor salts, zirconia or YSZ, conductivity-producing metal salts, stabilizing metal salts, and the one or more transition metal oxides or metal oxide precursors may be mixed together in a selected solvent together, dried to remove solvents, and then calcined together to yield the homogeneous salt precursor mixture. In some embodiments, mixing smaller quantities of precursors in smaller batches facilitate mixing and handling of large bulk quantities of salts and precursor salts. Thus, no limitations are intended.

In another exemplary step (116), the mixture containing $\alpha$-alumina, zirconia or YSZ, and respective metal oxides may be cast or pressed into a cast or pressed form that includes selected shaped structures. Casting methods may include, but are not limited to, e.g., tape casting. Pressing methods may include, but are not limited to, e.g., may include, but is not limited to, e.g., cold isostatic pressing (CIP). Shapes are not limited. In some embodiments, shapes may be in the form of a disk or a tube.

In another exemplary step (118), the pressed, cast, or shaped structures may be sintered at a temperature below about 1600° C. to simultaneously convert and densify the salts in the cast or pressed structures to yield a dense $\beta''$-alumina/zirconia or dense $\beta''$-alumina/YSZ composite solid electrolyte.

In some embodiments, sintering temperatures may be selected between about 1200° C. to below about 1600° C. In some embodiments, sintering temperatures may be selected between about 1200° C. to below about 1600° C. In some embodiments, sintering temperatures may be selected between about 1200° C. to about 1500° C. In some embodiments, sintering temperatures may be selected below about 1200° C. Thus, no limitations are intended. As will be appreciated by those of ordinary skill in the art, process steps described above are exemplary only. It should be understood that steps may be performed concurrently, serially, in a different sequence, optionally, or independently. For example, as described herein, alumina, zirconia or YSZ, and all selected metal oxides or precursors may be simultaneously be mixed and milled together prior to sintering. Use of smaller batches may be used to facilitate handling of the large quantity of different salts. Thus, no limitations are intended by the description of the exemplary process.

The present invention is advantageous as it fabricates the dense $\beta''$-$Al_2O_3$/zirconia or YSZ composite solid electrolyte at a sintering temperature that is up to 200° C. lower than for conventional high-temperature processing. In particular, with the starting material of Boehmite, pure $\beta''$-$Al_2O_3$ phase material can be formed at a temperature as low as 900° C. The lower temperature process is also more efficient and more cost-effective at the lower temperatures. Lower temperature processing also permits use of lower temperature equipment including furnaces. The process also achieves densification and conversion in a single sintering step compared with separate densification and conversion steps required in conventional fabrication.

Figure 2A:
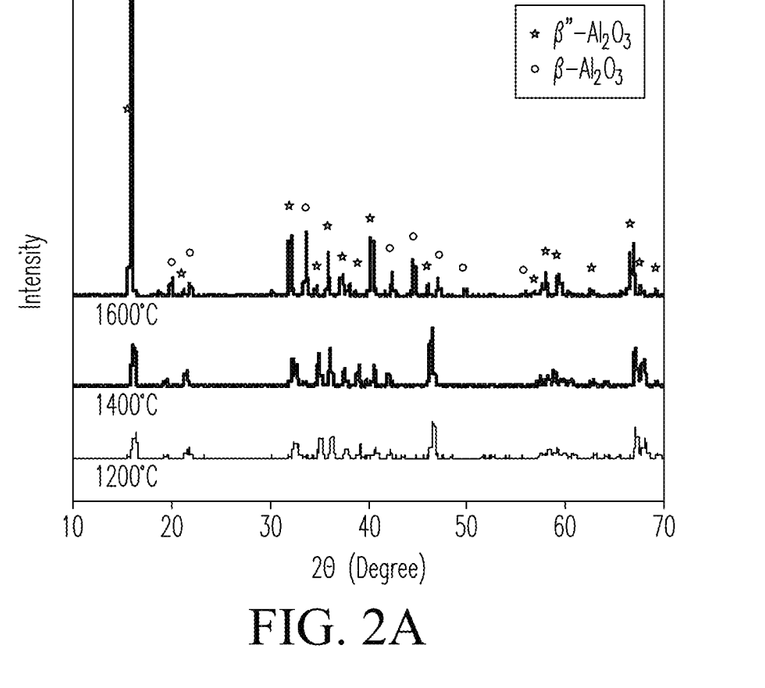
FIGS. 2A-2C are XRD plots that compare stability of the β"-$Al_2O_3$ phase in solid electrolytes prepared from Boehmite and other salts as a function of temperature.

FIG. 2A compares XRD diffraction patterns for a sintered precursor mixture of Boehmite and $TiO_2$ (2 mol %) sintered at temperatures between 1200° C. and 1600° C. Results show the sintered precursor mixture successfully converts to pure $\beta''$-$Al_2O_3$ in the presence of $TiO_2$ at temperatures between 1200° C. to below 1600° C. However, at 1600° C., the sintered precursor mixture phase separates to form a quantity of the $\beta'$-alumina phase. Temperatures may be selected that aid the conversion of selected precursors but that maintain the desired $\beta''$-alumina phase.

Figure 2B:
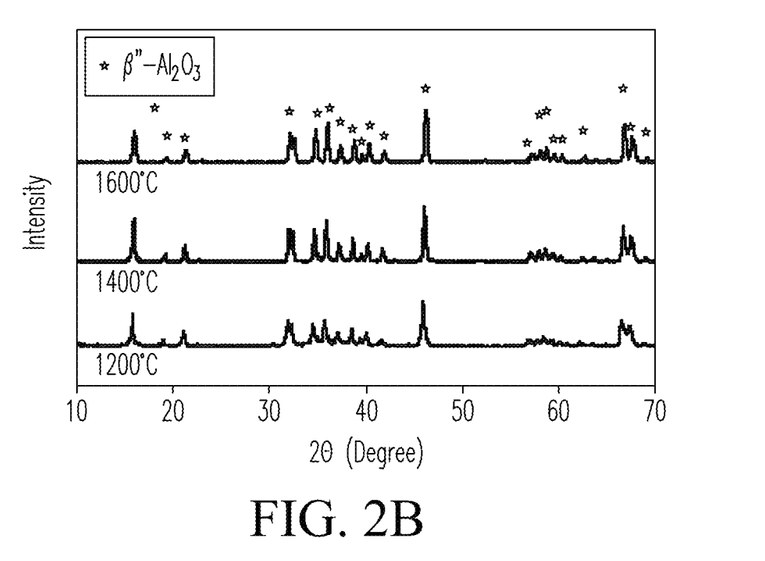

FIG. 2B compares XRD diffraction patterns for a sintered precursor mixture of Boehmite and $MnO_2$ (2 mol %) sintered at temperatures between 1200° C. and 1600° C. Results show the sintered precursor mixture successfully converts to pure $\beta''$-$Al_2O_3$ in the presence of $MnO_2$ at temperatures between 1200° C. to 1600° C.

Figure 2C:
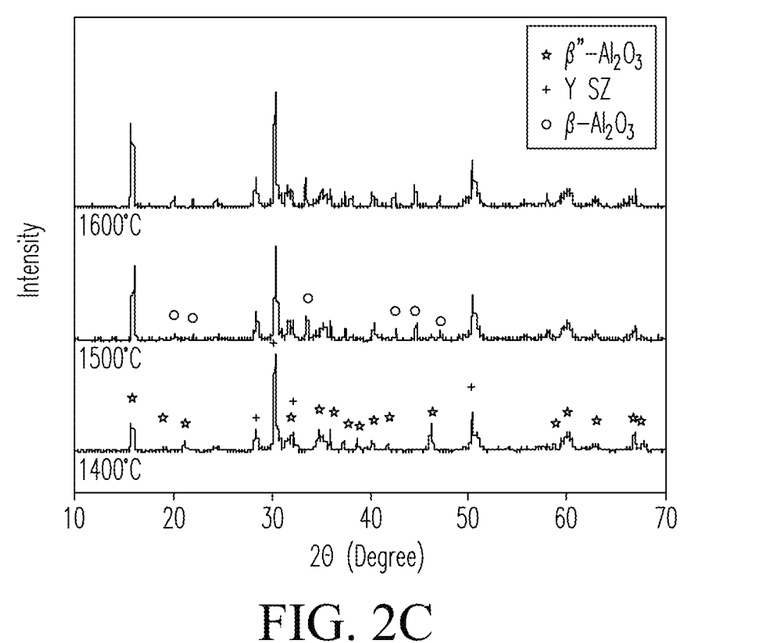

FIG. 2C compares XRD diffraction patterns for a sintered precursor mixture of Boehmite, $MnO_2$ (2 mol %), YSZ, and $MnO_2$ (2 mol %) sintered at temperatures between 1200° C. and 1600° C. Results show the sintered precursor mixture successfully converts to pure $\beta''$-$Al_2O_3$ in the presence of $MnO_2$ at temperatures between 1200° C. to below 1500° C. Results above 1500° C. are attributed to the competing properties between the components YSZ and $MnO_2$ that act as sintering aids in the conversion of alumina to $\beta''$-$Al_2O_3$, and $TiO_2$ that aids the densification of mixed components.

In some embodiments, $TiO_2$ and $MnO_2$ (or their precursors) may be added to the precursor mixtures of alumina or alumina precursor salts and/or zirconia or YSZ at concentrations below about 10 mol %.

In some embodiments, $TiO_2$ and $MnO_2$ may be added to the precursor mixtures of alumina or alumina precursor salts and/or zirconia or YSZ at concentrations between about 5 mol % to about 10 mol %.

In some embodiments, $TiO_2$ and $MnO_2$ may be added to the precursor mixtures of alumina or alumina precursor salts and/or zirconia or YSZ at concentrations below about 5 mol %.

In some embodiments, $TiO_2$ and $MnO_2$ may be added to the precursor mixtures of alumina or alumina precursor salts and/or zirconia or YSZ at concentrations between about 2 mol % to about 5 mol %.

Addition of $TiO_2$ and $MnO_2$ aids conversion of alumina and/or alumina precursors and the densification of salts in precursor mixtures at selected temperatures which yields the dense $\beta''$-alumina/zirconia or dense $\beta''$-alumina/YSZ solid electrolyte.

Figure 3:
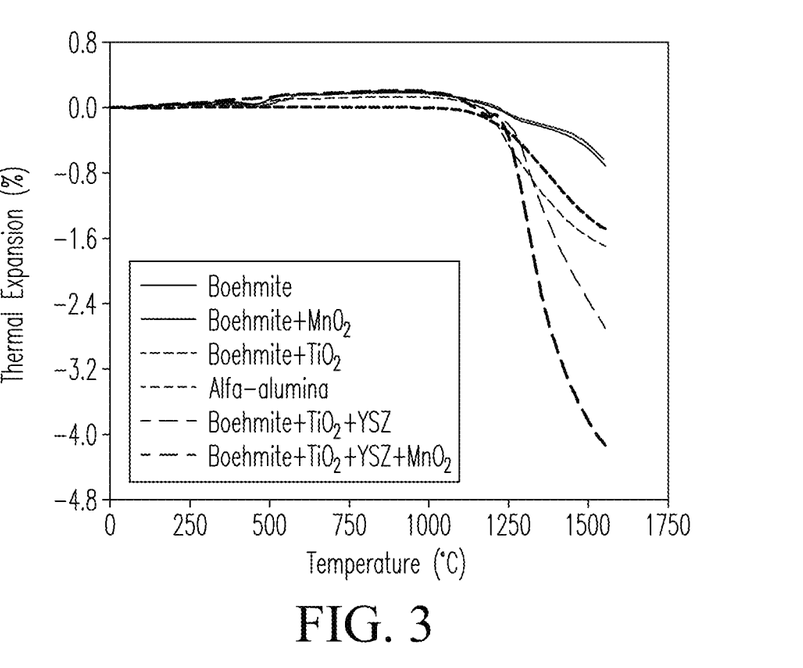
FIG. 3 presents sintering curves showing effect of added salts on densification of powder precursor mixtures containing Boehmite as a function of temperature.

FIG. 3 presents sintering curves showing effect of added salts on densification of precursor mixtures of Boehmite and other added salts as a function of temperature. In the figure, densification is most pronounced for the precursor mixture containing Boehmite, $TiO_2$, zirconia or YSZ, and $MnO_2$ sintered at temperatures between about 1200° C. to about 1600° C.

Figure 4A:
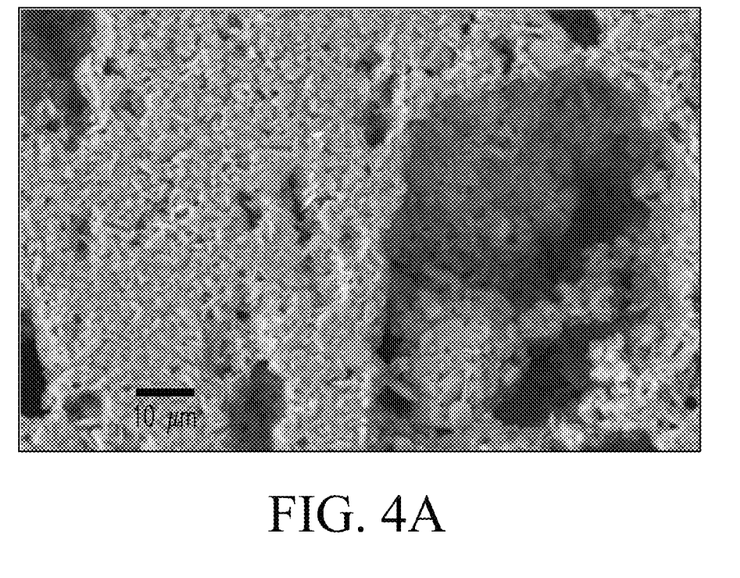
FIGS. 4A-4D show densities of structures containing Boehmite and other salts sintered and densified at a temperature of 1400° C.
Figure 4B:
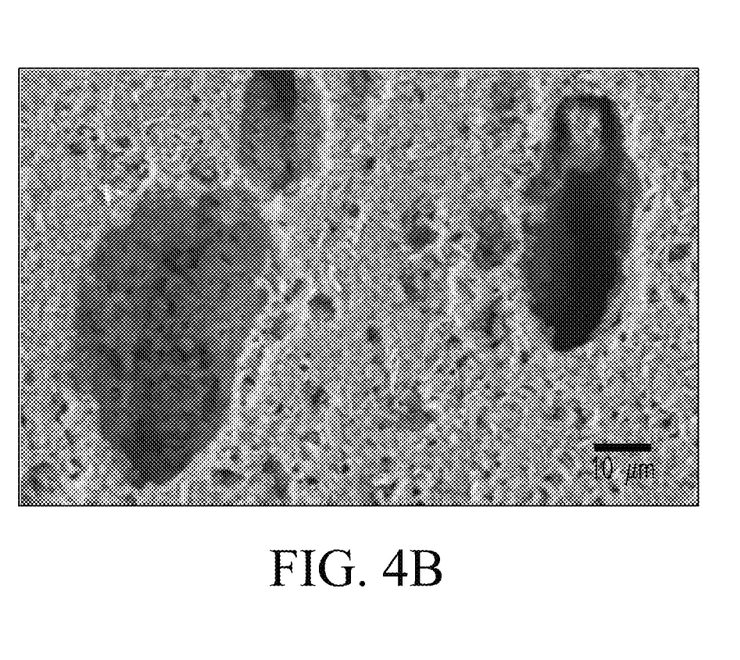
Figure 4C:
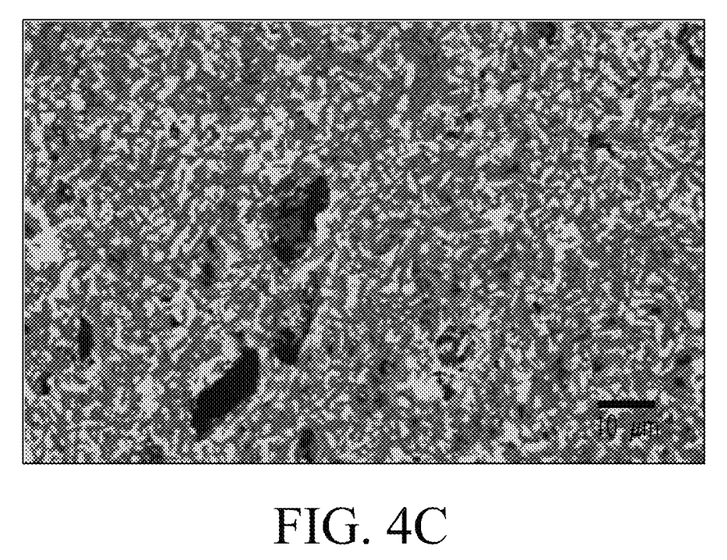
Figure 4D:
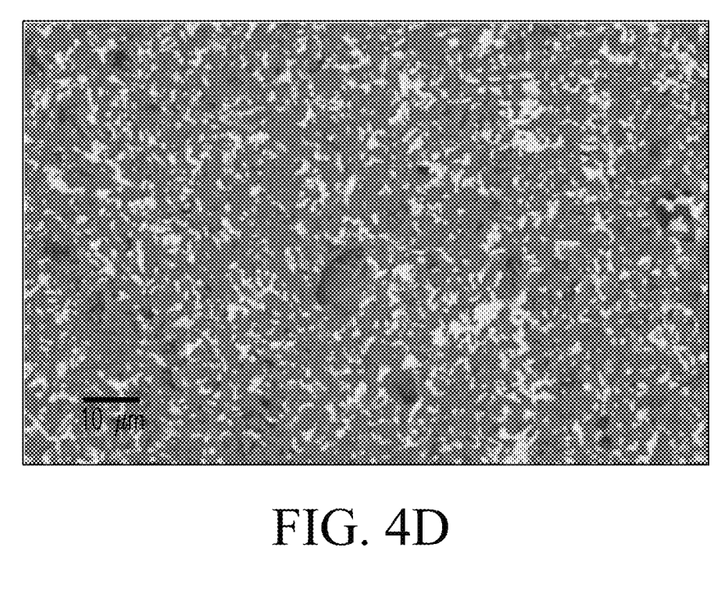

FIG. 4A shows that the precursor mixture containing only Boehmite when sintered at 1400° C. yields a density of only about 38%. FIG. 4B, shows that the precursor mixture containing Boehmite and $TiO_2$ when sintered at 1400° C. yields a density of only about 60%. FIG. 4C shows that the precursor mixture containing Boehmite, $TiO_2$, and zirconia or YSZ when sintered at 1400° C. yields a density of 83%. FIG. 4D shows that the precursor mixture containing Boehmite, $TiO_2$, zirconia or YSZ, and $MnO_2$ when sintered at 1400° C. yields a density of 98%. Results clearly show the presence of metal oxides $TiO_2$ and $MnO_2$ facilitate conversion of the alumina and densification of the precursor mixture into the solid electrolyte, respectively.

Figure 5A:
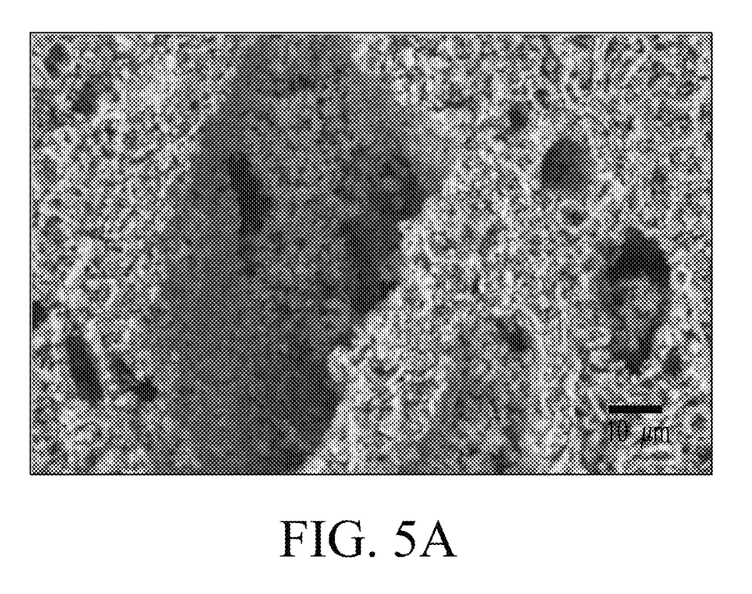
FIGS. 5A-5D show densities of structures containing Boehmite and other salts sintered and densified at a temperature of 1500° C.
Figure 5B:
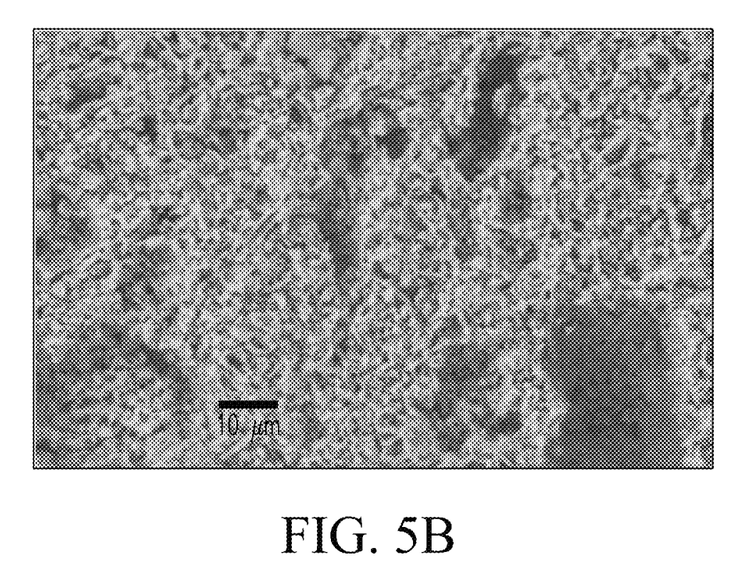
Figure 5C:
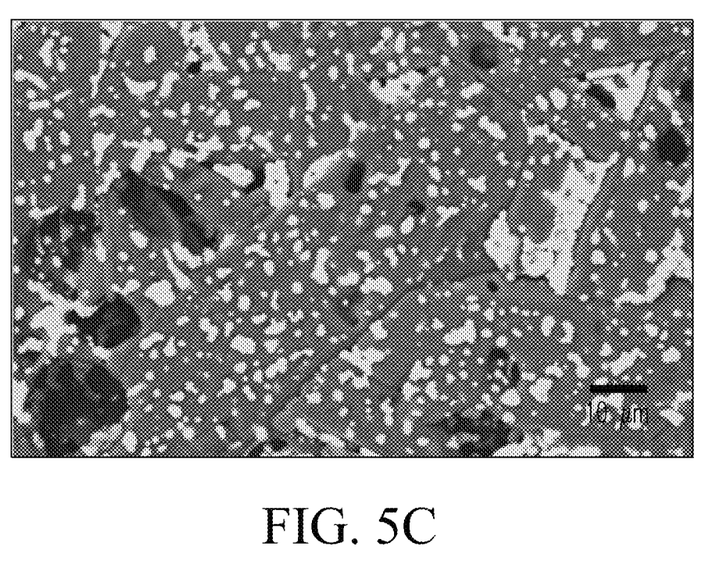
Figure 5D:
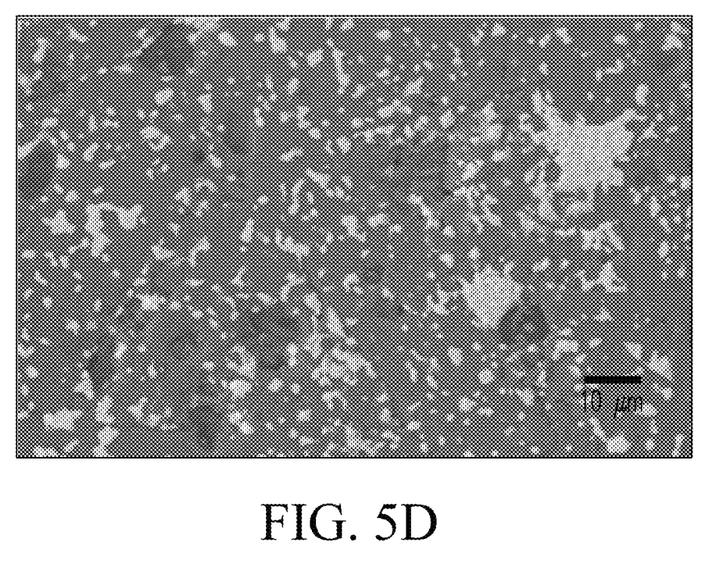

FIG. 5A shows that a precursor mixture containing only Boehmite when sintered at 1500° C. yields a density of only about 40%. In FIG. 5B, the precursor mixture containing Boehmite and $TiO_2$ when sintered at 1500° C. yields a density of only about 60%. In FIG. 5C, the precursor mixture containing Boehmite, $TiO_2$, and zirconia or YSZ when sintered at 1500° C. yields a density of above 80% to about 86%. In FIG. 5D, the precursor mixture containing Boehmite, $TiO_2$, zirconia or YSZ, and $MnO_2$ yields a density when sintered at 1500° C. of about 99%. Results clearly show the presence of metal oxides $TiO_2$ and $MnO_2$ facilitate conversion of the alumina and densification of the precursor mixture into electrolyte, respectively. Greater density results may be attributed to sintering at the higher temperature.

In some embodiments, density of the composite solid electrolyte is greater than or equal to about 90%. In some embodiments, density of the composite solid electrolyte is greater than or equal to about 97%. In some embodiments, density of the composite solid electrolyte is greater than or equal to about 98%.

Resistivity and Conductivity

TABLE 1 compares resistivity values [in ohms ($\Omega$)] of a representative dense $\beta''$-$Al_2O_3$/YSZ composite solid electrolyte of the present invention prepared at selected sintering temperatures between about 1400° C. to about 1500° C.

TABLE 1

Compares resistivity values for $\beta''$-$Al_2O_3$/YSZ composite solid electrolytes of the present invention measured at operation temperatures from 100° C. to 300° C.**

| Sintering Temperature | 150° C. | 200° C. | 250° C. | 300° C. |
|---|---|---|---|---|
| 1400° C. | 98.81 | 50.4 | 24.20 | 20.17 |
| 1500° C. | 110.6 | 59.9 | 34.80 | 25.01 |
| 1600° C. | 156.9 | 79.59 | 46.24 | 32.57 |
| 1400° C. (2X Na) | 78.54 | 42.12 | 23.40 | 18.43 |
| 1500° C. (2X Na) | 113.1 | 61.46 | 34.94 | 23.86 |

**reported in units of ($\Omega \cdot$ cm).

In some embodiments, the $\beta''$-$Al_2O_3$/YSZ composite solid electrolyte may include a sodium metal (Na) to aluminum metal (Al) ratio of 1×. The designation "1×" means a sodium (Na) to aluminum (Al) metal ratio in the resulting solid electrolyte of [1.67 Na: 10.67 Al]. In some embodiments, the Na to Al ratio may be 1.5×. In some embodiments, the Na to Al ratio can be 2×. The designation 2× means the Na to Al ratio is 2 times greater than that of the 1× state, i.e., [3.34 Na: 10.67 Al]. Resistivity is inversely related to the ionic conductivity (1/$\Omega$m, or 1/$\rho$, or $\sigma$). Ionic conductivity measures how easily electrical current flows through the $\beta''$-$Al_2O_3$/zirconia or YSZ composite solid electrolyte.

The dense $\beta''$-$Al_2O_3$/zirconia or YSZ composite solid electrolyte of the present invention is suitable as a component of sodium energy storage devices including, but not limited to, e.g., sodium-conducting [e.g., $\beta''$-alumina solid electrolyte (BASE)] batteries, ZEBRA batteries, sodium metal halide batteries, liquid sodium batteries, molten sodium batteries, sodium-sulfur (Na/S) batteries, and intermediate temperature (<200° C.) sodium beta batteries. Sodium energy storage devices may be employed as components in energy producing devices and systems such as, e.g., power-grid systems and in other energy producing applications.

EXAMPLES

The following examples provide a further understanding of various aspects of the present invention.

Example 1

Fabrication of High-Performance Composite Solid Electrolyte with Combined Densification and Conversion Sintering (1)

A composite solid electrolyte comprised of $\beta''$-$Al_2O_3$ and YSZ was fabricated. Boehmite (AlOOH), 99.9% $NaNO_3$ (Sigma-Aldrich, St. Louis, Mo., USA), 99.99% $LiNO_3$ (Sigma-Aldrich), 97% Ti{OCH(CH$_3$)$_2$}$_4$ (Alfa Aesar, Ward Hill, Mass., USA USA), YSZ (e.g., 5YSZ, UCM Advanced Ceramics GmbH, Laufenburg, Germany), and 99.98% Mn(NO$_3$)$_2$.xH$_2$O (Alfa Aesar) were used as starting materials. In a first batch mixture, precursor powders of Boehmite, $NaNO_3$, and $LiNO_3$ were mixed at selected mole ratios according the formula $Na_{1.67}Al_{10.67}Li_{0.33}O_{17}$, i.e., with a "1×" ratio of Na to Al sodium. A quantity of Ti{OCH(CH$_3$)$_2$}$_4$ was added as a titanium oxide precursor to the Boehmite powder. Precursors were thoroughly mixed with a mixing medium of zirconia balls for 12 h in isopropyl alcohol solvent, then dried, and then calcined at 900° C. for 10 h in air to form $TiO_2$ at a ratio in the mixture of 2 mol %. In a second batch mixture, a precursor powder of Mn(NO$_3$)$_2$.xH$_2$O was thoroughly mixed with YSZ in isopropyl alcohol, dried, and calcined at 900° C. for 10 h in air to form $MnO_2$ at a ratio in the salt mixture of 5 mol %. Selected ratios of the two batch mixtures were mixed together to produce a weight ratio between $Al_2O_3$ and YSZ of 7:3 [i.e., 7 $Al_2O_3$: 3 YSZ], or an alumina ratio greater than about 50% by volume. The mixed powders were then attrition-milled, isostatically-pressed or tape-cast, and then sintered in air for 5 hours at a temperature selected between about 1400° C. to about 1500° C. to achieve a dense $\beta''$-$Al_2O_3$/YSZ composite solid electrolyte. The electrolyte was fashioned in form of a disk.

Example 2

Fabrication of High-Performance Composite Solid Electrolyte with Combined Densification and Conversion Sintering (2)

In an alternative embodiment, desired amounts of Boehmite, $NaNO_3$, $LiNO_3$, Ti{OCH(CH$_3$)$_2$}$_4$, YSZ, and Mn(NO$_3$)$_2$.xH$_2$O were mixed together and calcined at 900° C. to form 2 mol % $TiO_2$ and 5 mol % $MnO_2$ in the salt mixture. The mixed precursor salts were then attrition-milled, isostatically-pressed or tape-cast and sintered in air for 5 hours at a temperature between about 1400° C. to about 1500° C. to achieve a dense $\beta''$-$Al_2O_3$/YSZ composite solid electrolyte. The electrolyte was fashioned in form of a disk as described above in EXAMPLE 1.

While exemplary embodiments of the present invention have been shown and described, it will be apparent to those skilled in the art that many changes and modifications may be made without departing from the invention in its true scope and broader aspects. The appended claims are therefore intended to cover all such changes and modifications as fall within the spirit and scope of the present invention.

What is claimed is:

1. A fabrication process comprising:
   (a)(1) calcining a mixture of Boehmite, zirconia or YSZ, Ti{OCH(CH$_3$)$_2$}$_4$, and Mn(NO$_3$)$_2$; or
   (a)(2) calcining a mixture of Boehmite and Ti{OCH(CH$_3$)$_2$}$_4$, resulting in a first calcined product; separately calcining a mixture of YSZ and Mn(NO$_3$)$_2$ resulting in a second calcined product; and combining together the first calcined product and the second calcined product,
   wherein the (a)(1) or (a)(2) calcining is performed at 400° C. to 900° C.; and
   (b) sintering the (a)(1) calcined product or the (a)(2) combined calcined product in air at a temperature at or below about 1600° C. for a time selected to form a dense β" alumina/zirconia or YSZ composite solid electrolyte.

2. The process of claim 1, wherein the YSZ is doped with a quantity of yttrium at or below about 10 mol % by weight.

3. The process of claim 1, wherein the ratio of Boehmite to zirconia or YSZ in the mixture prior to sintering is greater than about 50% by volume.

4. The process of claim 1, wherein the ratio of Boehmite to zirconia or YSZ in the mixture prior to sintering is less than about 50% by volume.

5. The process of claim 1, wherein the composite solid electrolyte includes a concentration of MnO$_2$ and TiO$_2$ at or below about 10% by weight on average.

6. The process of claim 1, wherein the sintering is performed at a temperature between about 900° C. to about 1200° C.

7. The process of claim 1, wherein the sintering is performed at a temperature between about 1200° C. to about 1500° C.

8. The process of claim 1, wherein the composite solid electrolyte has a mechanical strength that is at least about 300 MPa.

9. The process of claim 1, wherein the density of the composite solid electrolyte is greater than or equal to 98%.

10. The process of claim 1, wherein the only source of aluminum is the Boehmite.

11. The process of claim 10, wherein the YSZ is doped with a quantity of yttrium at or below about 10 mol % by weight.

12. The process of claim 10, wherein the ratio of Boehmite to zirconia or YSZ in the mixture prior to sintering is greater than about 50% by volume.

13. The process of claim 10, wherein the ratio of Boehmite to zirconia or YSZ in the mixture prior to sintering is less than about 50% by volume.

14. The process of claim 10, wherein the composite solid electrolyte includes a concentration of MnO$_2$ and TiO$_2$ at or below about 10% by weight on average.

15. The process of claim 10, wherein the (a)(1) or (a)(2) calcining mixture comprises at least one stabilizing metal salts.

16. The process of claim 15, wherein the stabilizing metal salts comprises lithium salts, magnesium salts, or any combinations thereof.

17. The process of claim 1, wherein the composite solid electrolyte further comprises Na.

18. The process of claim 17, wherein the composite solid electrolyte includes a ratio of Na to Al of [1.67:10.67]; or [3.34:10.67]; or [4.18 to 10.67].

19. The process of claim 1, wherein the Ti{OCH(CH$_3$)$_2$}$_4$ is present in the (a)(1) or (a)(2) calcining mixture at or below about 10 mol %.

20. The process of claim 1, wherein the weight ratio of Boehmite:zirconia or Boehmite:YSZ in the mixture is about 7:3.

21. The process of claim 1, wherein the (a)(1) or (a)(2) calcining mixture comprises at least one stabilizing metal salt.

22. The process of claim 21, wherein the at least one stabilizing metal salt comprises lithium salts, magnesium salts, or any combinations thereof.

23. The process of claim 1, wherein the Mn(NO$_3$)$_2$ is present in the (a)(1) or (a)(2) calcining mixture at or below about 10 mol %.

24. The process of claim 1, wherein the (a)(1) calcining mixture further comprises NaNO$_3$ and LiNO$_3$.

25. The process of claim 1, wherein the composite solid electrolyte has a density greater than or equal to 97%.

26. The process of claim 1, wherein the composite solid electrolyte has a density greater than or equal to 98%.

27. The process of claim 1, wherein the composite solid electrolyte has a density greater than or equal to 99%.

28. The process of claim 1, wherein the process includes the (a)(1) calcining.

29. The process of claim 1, wherein the process includes the (a)(2) calcining.

* * * * *